United States Patent [19]
Karabinis

[11] Patent Number: 5,937,332
[45] Date of Patent: Aug. 10, 1999

[54] SATELLITE TELECOMMUNICATIONS REPEATERS AND RETRANSMISSION METHODS

[75] Inventor: Peter D. Karabinis, Cary, N.C.

[73] Assignee: Ericsson, Inc., Research Triangle Park, N.C.

[21] Appl. No.: 08/823,027

[22] Filed: Mar. 21, 1997

[51] Int. Cl.⁶ ..................................................... H04B 1/38
[52] U.S. Cl. ........................... 455/12.1; 455/11.1; 455/90
[58] Field of Search ................... 455/11.1, 12.1, 455/13.1, 427, 428, 429, 561; 343/702; 248/291.1

[56] References Cited

U.S. PATENT DOCUMENTS

| | | | |
|---|---|---|---|
| 4,041,389 | 8/1977 | Oades | 455/17 |
| 4,198,600 | 4/1980 | Oguchi et al. | 455/15 |
| 4,880,196 | 11/1989 | Eichenlaub | 248/293 |
| 4,965,548 | 10/1990 | Fayfield | 340/511 |
| 4,972,505 | 11/1990 | Isberg | 455/3 |
| 4,979,170 | 12/1990 | Gilhousen et al. | 370/104.1 |
| 5,023,930 | 6/1991 | Leslie | 455/9 |
| 5,134,708 | 7/1992 | Marui et al. | 455/33.2 |
| 5,152,002 | 9/1992 | Leslie et al. | 455/11.1 |
| 5,231,646 | 7/1993 | Heath et al. | 375/1 |
| 5,233,626 | 8/1993 | Ames | 375/1 |
| 5,303,286 | 4/1994 | Wiedeman | 379/59 |
| 5,303,393 | 4/1994 | Noreen et al. | 455/3.2 |
| 5,339,330 | 8/1994 | Mallinckrodt | 375/1 |
| 5,448,623 | 9/1995 | Wiedeman et al. | 379/59 |
| 5,486,836 | 1/1996 | Kuffner et al. | 343/702 |
| 5,490,284 | 2/1996 | Itoh et al. | 455/11.1 |
| 5,526,404 | 6/1996 | Weideman et al. | 379/60 |
| 5,537,472 | 7/1996 | Estevez-Alcolado et al. | 379/433 |
| 5,542,104 | 7/1996 | Ozawa et al. | 455/89 |
| 5,552,798 | 9/1996 | Dietrich et al. | 343/893 |
| 5,559,865 | 9/1996 | Gilhousen | 379/57 |
| 5,587,717 | 12/1996 | Jang | 342/359 |
| 5,628,049 | 5/1997 | Suemitsu | 455/11.1 |
| 5,812,086 | 9/1998 | Bertiger et al. | 342/357 |

FOREIGN PATENT DOCUMENTS

| | | | |
|---|---|---|---|
| 2 719 427-A1 | 3/1995 | France . | |
| 0 302 455 | 8/1988 | Germany | H04B 7/155 |
| 0 570 325 A1 | 5/1993 | Germany | H04B 1/38 |
| 0 724 355 A2 | 1/1996 | Germany | H04B 1/38 |
| 2 247 379 | 2/1992 | United Kingdom . | |

*Primary Examiner*—Reinhard J. Eisenzopf
*Assistant Examiner*—Duc Nguyen
*Attorney, Agent, or Firm*—Myers Bigel Sibley & Sajovec

[57] ABSTRACT

Satellite telecommunications repeaters are provided which receive, amplify, and locally retransmit the downlink signal received from a satellite thereby increasing the effective downlink margin in the vicinity of the satellite telecommunications repeaters and allowing an increase the penetration of uplink and downlink signals into buildings, foliage, transportation vehicles, and other objects which can reduce link margin. Both portable and non-portable repeaters are provided.

7 Claims, 6 Drawing Sheets

SATELLITE TELECOMMUNICATIONS REPEATERS AND RETRANSMISSION METHODS

FIELD OF THE INVENTION

The present invention relates to satellite telecommunications systems and methods, and in particular, to systems and methods which can improve the link margins between satellites and radiotelephones.

BACKGROUND OF THE INVENTION

Satellite radiotelephone communications systems are used widely to provide dependable, high quality communications. See, for example, U.S. Pat. No. 5,303,286 to Robert A. Wiedeman, entitled Wireless Telephone/Satellite Roaming System.

FIG. 1 is a conceptual diagram of a satellite radiotelephone system. As shown in FIG. 1, a satellite radiotelephone system typically includes one or more satellites 110, which may serve as relays or transponders between at least one central earth station 130 and radiotelephones 120. The earth station may in turn be connected to a public switched telephone network 140, allowing communications between satellite radiotelephones, and communications between satellite radiotelephones and conventional terrestrial cellular radiotelephones or landline telephones. The satellite radiotelephone system may utilize a single antenna beam covering the entire area served by the system, or, as shown in FIG. 1, the satellite may be designed such that it produces multiple beams 150, each serving distinct geographical coverage areas 160 in the system's service region. Thus, a cellular architecture similar to that used in conventional terrestrial cellular radiotelephone systems can be implemented in a satellite-based system. The satellite 110 typically communicates with a radiotelephone 120 over a bidirectional communications pathway, with radiotelephone communications signals being communicated from the satellite 110 to the radiotelephone 120 over a downlink (or forward link) 170, and from the radiotelephone 120 to the satellite 110 over an uplink (or reverse link) 180.

Satellite radiotelephone systems are increasingly being developed for areas where the small number of thinly scattered users and/or the rugged topography may make conventional landline telephone or cellular telephone infrastructure technically or economically impractical. Unfortunately, many of the natural features which may make it commercially impractical to install conventional landline or cellular telephone infrastructures may also impede signals traveling between radiotelephones and satellites. Dense foliage, hills, mountain ranges, and adverse weather conditions may all impede the relatively weak signals transmitted by satellites and radiotelephones.

Satellite radiotelephone systems may also serve urban areas where large buildings and other man-made structures may contribute to the degradation of satellite telecommunications signals caused by any naturally occurring features. It is also expected that a radiotelephone user will desire to use the radiotelephone while in a building or while riding in an automobile or other vehicle. The structure, mechanical operation and electrical circuitry present in an automobile or any other vehicle, and the structure of a building, along with any electrical or mechanical systems found therein or nearby, may further weaken signals traveling between satellites and radiotelephones.

The relatively small link margins involved in the typical satellite telecommunications system may be further decreased by a host of other physical processes. Both the forward and return link signals may be subject to numerous degrading conditions. For example, communications links between transmitters and receivers in mobile communications systems may be affected by channel fading. Link degradation is generally caused by a combination of effects including multipath fading, Doppler shift due to the movement of the receiver relative to the transmitter, and additive noise.

Multipath fading is the result of a multipath channel existing whenever there is more than one path for the transmitted energy to travel between transmitter and receiver. For example, a satellite communications downlink may have a direct path between the satellite and the mobile user plus a reflected path from the ground or from other structures. In general, the reflected path will arrive at the receiver out-of-phase with the direct path and the amplitude of the received signal will be attenuated by the multipath effect. As the mobile user travels, the phase difference will generally change, resulting in a time-varying amplitude at the receiver. Multipath channel fading as predicted by the Rician channel model (when the line-of-sight path is strong compared to the reflected paths), is expected to consume from 3 to 5 decibels of the available link margin. Additionally, just the proximity of a human body to the radiotelephone may also degrade the link margin by from 2 to 4 decibels.

In order to provide robust, stable communications, a satellite telecommunications system should generally provide signals of adequate strength to penetrate both natural and man-made obstacles which are in the signal path between the satellite and the radiotelephone. Unfortunately, satellites such as those comprising the Mobile Satellite System (MSS) now being implemented in the United States by the American Mobile Satellite Corporation, are generally severely power limited so it may be difficult to offer forward link margins that compare favorably to those offered by terrestrial cellular and/or Personal Communication Service (PCS) base stations. Likewise, the radiated power levels of radiotelephones are also generally limited due to the size limitations of hand-held radiotelephones and power consumption limitations (as a function of battery charge life). Unfortunately, typical satellite antennas planned for deployment by MSS satellites are also generally size limited and thus may not be able to compensate for the low transmission power of the uplink signal transmitted by the radiotelephone. The result is both forward and reverse link margins which may be relatively small.

The MSS satellites presently planned for deployment in the 1998–2000 time frame are only expected to provide link margins on the order of 8–16 dB above the ideal additive white gaussian noise (AWGN) channel. Such link margins may necessitate an almost completely unobstructed line-of-site (LOS) path between the radiotelephone and the satellite with little link margin left over to compensate for shadowing and or blockage caused by terrain, trees, foliage, and buildings.

SUMMARY OF THE INVENTION

In light of the foregoing, it is an object of the present invention to provide satellite telecommunications systems, components, and methods which can increase the penetration of uplink and downlink signals into buildings, foliage, transportation vehicles, and other objects which can reduce link margin.

This and other objects are accomplished according to the present invention by providing satellite telecommunications repeaters that receive, amplify, and locally retransmit the downlink signal received from a satellite thereby increasing the effective downlink margin in the vicinity of the satellite telecommunications repeaters. Furthermore, satellite telecommunications repeaters according to the present invention receive uplink signals transmitted by radiotelephones in the vicinity of the repeaters, amplify, and retransmit such signals thereby increasing the effective uplink margin.

According to one aspect of the present invention, constant gain, non-processing satellite telecommunications repeaters serve both the forward and the return links to enable operation of hand-held radiotelephones within vehicles, buildings, airports, and in areas with heavy foliage or mountainous terrain which might not otherwise have sufficient link margin to support such communications. Patch antenna assemblies may be employed to receive and retransmit forward link signals and to receive and retransmit reverse link signals.

Non-portable, mounted satellite telecommunications repeaters may be used wherein the antennas which receive downlink signals and retransmit uplink signals are placed at a distance from and/or on the opposite side of some physical structure (such as a wall or ceiling) from the antennas which receive uplink signals and which retransmit downlink signals. These non-portable, mounted repeaters may be either mobile, such as when mounted to a vehicle, or non-mobile, such as when mounted to a building. This configuration of the non-portable, mounted repeaters of the present invention can provide greater antenna isolation, thus allowing greater repeater gain without instability. The greater gain can ultimately result in greater increase in link margins than might be had if the antennas were closer or were not separated by a barrier which tends to weaken interfering leakage signals from the retransmitting antennas of the repeaters.

Satellite telecommunications repeaters according to the invention may also be contained in single, portable, handheld housings. These portable repeaters may have many features including a flap, or cover, into which a patch antenna assembly may be incorporated for receiving downlink signals and retransmitting uplink signals. The flap patch antenna assembly is preferably attached to the housing of the portable unit using a hinge or swivel which allows positioning of the flap/patch antenna assembly in relation to satellites to achieve a further increase in link margin. The portable repeaters may also include various types of extensions used to support the repeater housing in an operating position. According to one embodiment of the present invention, the satellite telecommunications repeaters may employ one or more legs rotatably attached to the hand-held housing to support the repeater in an operating position.

According to another aspect of the present invention, the antennas of the satellite telecommunications repeaters used for receiving downlink signals from satellites and for retransmitting uplink signals to satellites may be aligned to satellites using conventional methods such as mechanical tracking and beam steering to thereby further increase link margin.

According to another aspect of the present invention, the antennas of portable embodiments of the satellite telecommunications repeaters of the present invention may be physically aligned to transmitting satellites by users by providing a circuit which determines the strength of signals traveling between the satellites and the repeater. By moving the repeater housing as a unit, or by only moving the antennas, until the signal strength increases, better alignment and potentially increased link margin may occur.

According to another aspect of the present invention, a sleep circuit is provided for the satellite telecommunications repeaters which can place the repeater in sleep, or stand-by, mode whenever no uplink signals from radiotelephones are present. This may serve to reduce satellite receiver noise and, particularly important in hand-held embodiments relying on internal battery power, to reduce power consumption by the repeater.

According to another aspect of the present invention, a device is provided to hold the satellite telecommunications repeater in close proximity to a window thereby improving the ability of the repeater to increase link margins within buildings. According to a preferred embodiment of the window holder device, suction cups, or some suitable alternative, hold one surface of the device in place against the surface of a window. The second surface of the device can then be rotated to a horizontal position and be held in that position by a support rod or bar. The repeater may then be placed on the horizontal surface.

With the aid of the present invention, lighter and smaller antennas having lower gain can be used on handheld radiotelephones and still maintain adequate link margin for satellite telecommunications. Additionally, as a result of having greater effective link margins, the radiotelephone equivalent isotropic radiated power (EIRP) level can on the average be reduced by an adaptive power control algorithm, as well as the satellite per-circuit EIRP. Less satellite per-circuit EIRP can provide higher system capacity assuming a satellite is power limited, as opposed to spectrally limited, while less phone EIRP can increase battery life for the hand-held unit.

DETAILED DESCRIPTION OF ILLUSTRATED EMBODIMENTS

Figure 1:
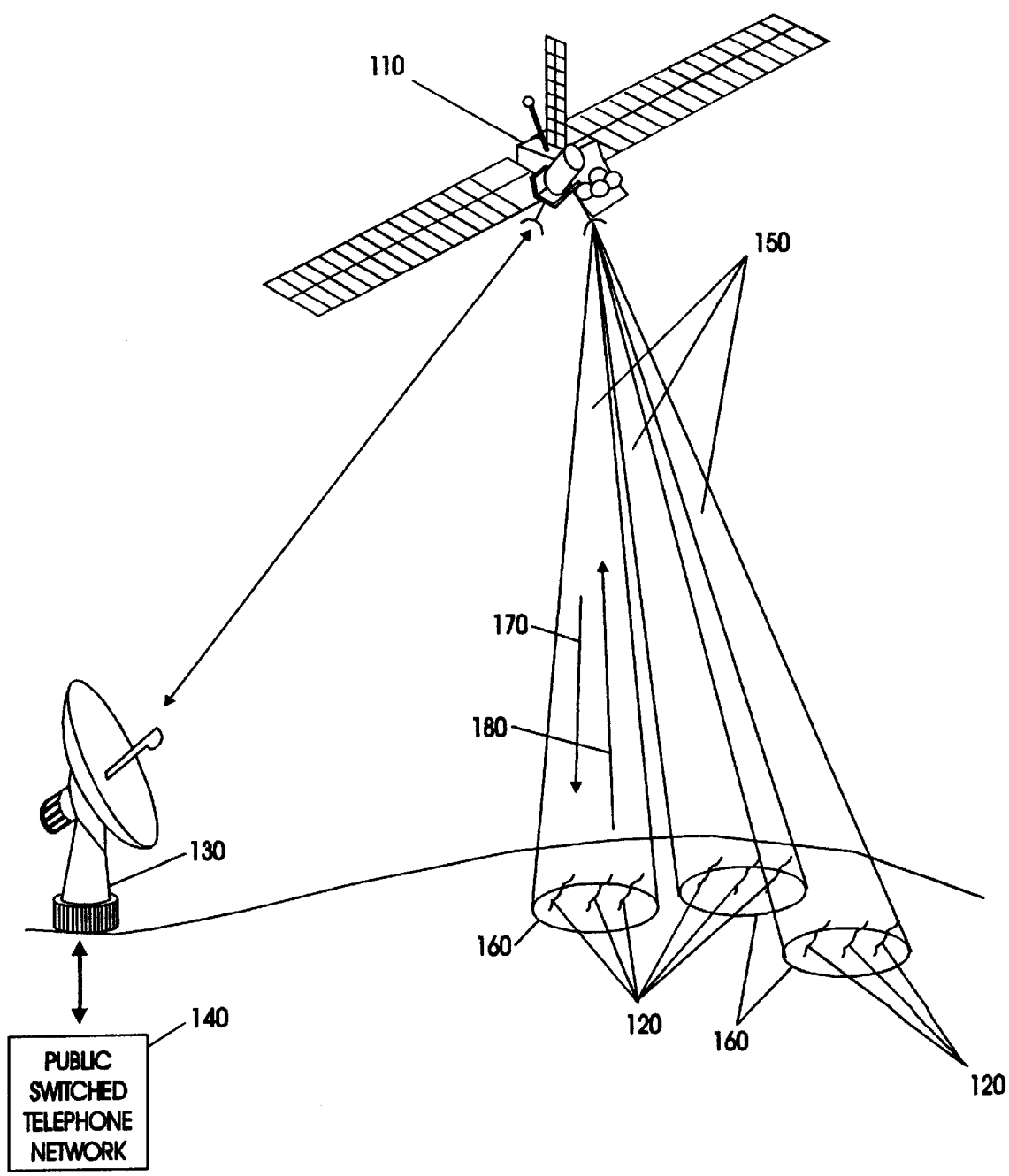
FIG. 1 illustrates a conceptual satellite communications system according to the prior art.

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the invention to those skilled in the art. In the drawings, like numbers refer to like elements throughout.

Figure 2:
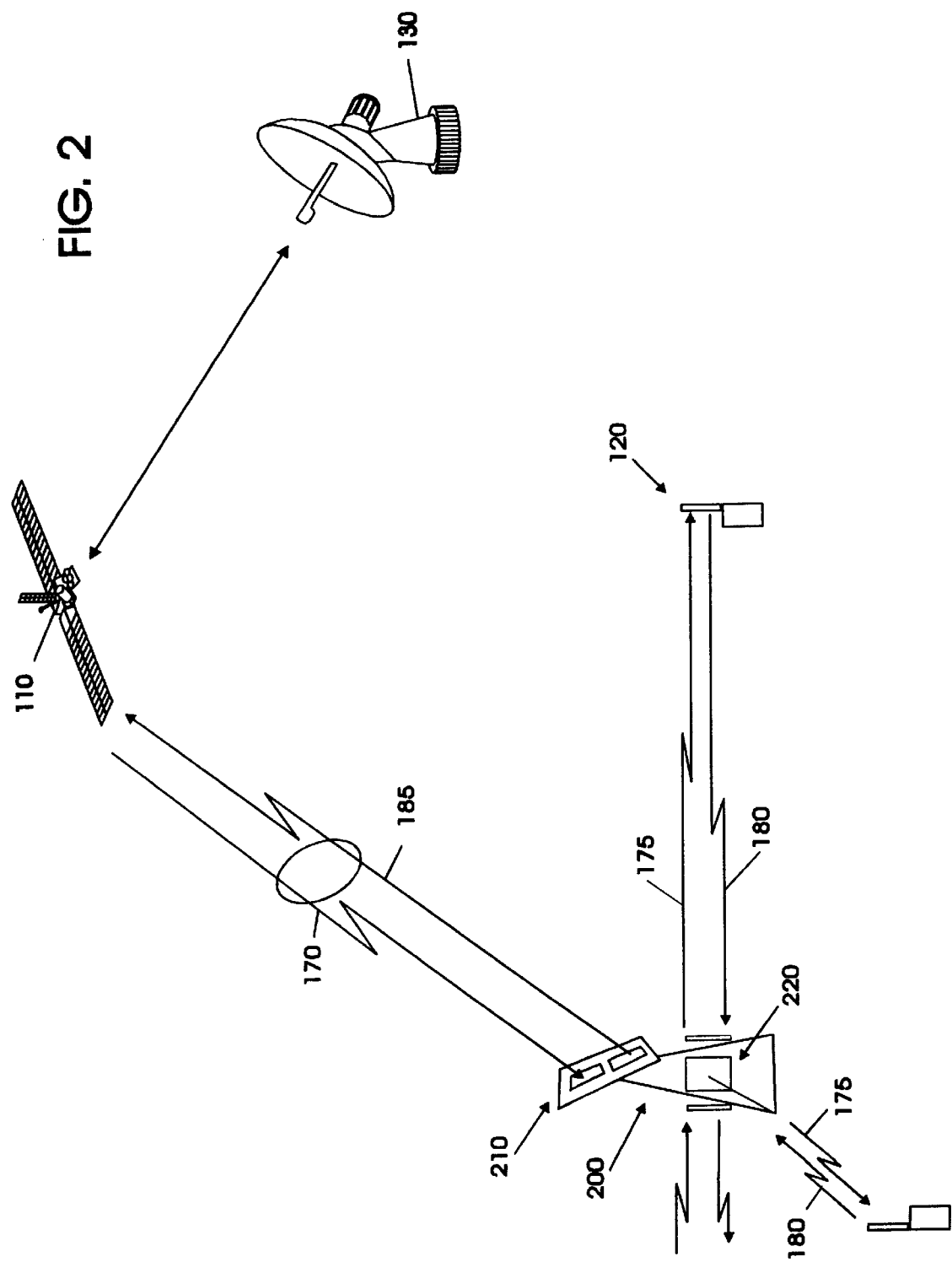
FIG. 2 illustrates a satellite communications system incorporating repeaters of the present invention.

FIG. 2 illustrates a system including repeaters according to the present invention. As shown in FIG. 2, a repeater 200 is added to the satellite telecommunications system to allow an increase in the ability of uplink signals 180 and downlink signals 170 to compensate for shadowing and or blockage caused by terrain, trees, foliage, and buildings thus effectively increasing the link margin between satellites 110 and hand-held radiotelephones 120. Before describing the satellite telecommunications repeaters of the present invention in detail, a description of the overall communications system will first be made so as to convey a complete understanding of the present invention.

Referring again to FIG. 2, a downlink signal 170 from one or more satellites 110 is received by a first antenna assembly 210 which is part of the satellite telecommunications repeaters 200 of the present invention. Upon receiving the downlink signal 170, the satellite telecommunications repeater 200 amplifies the downlink signal 170 and retransmits the signal to at least one radiotelephone 120. It is understood that amplified and retransmitted downlink signals 175 may be received by any number of radiotelephones 120 within the effective signal radius of the satellite telecommunications repeaters 200. The satellite telecommunications repeaters 200 also receive uplink signals 180 transmitted by one or more radiotelephones 120. The satellite telecommunications repeaters 200 then amplify and retransmit the uplink signals to at least one orbiting satellite 110 which receives and processes the signal.

The satellite telecommunications repeaters 200 according to the present invention may be non-portable and mounted in a stand alone fixed structure or they may be attached to a building or some other structure. See FIG. 5A for example. Non-portable, mounted satellite telecommunications repeaters 200 may also be mounted in a transportation vehicle and thus be mobile. See FIG. 5B for example. Finally, the satellite telecommunications repeaters 200 may be completely portable allowing someone, such as a satellite radiotelephone user, to carry the repeater and place it so as to increase the link margin in a particular area. FIG. 6 is an example of such a portable device.

The satellite telecommunications repeaters 200 of the present invention do not perform signal processing. The satellite telecommunications repeaters 200 serve only to amplify and retransmit uplink and downlink signals received, thus functioning as non-processing repeaters to increase link margin and coverage. As a result, the repeaters 200 may be stand-alone units and are not required to be tied to satellite switching networks or to other elements of satellite cellular or conventional cellular telephone networks.

Figure 3:
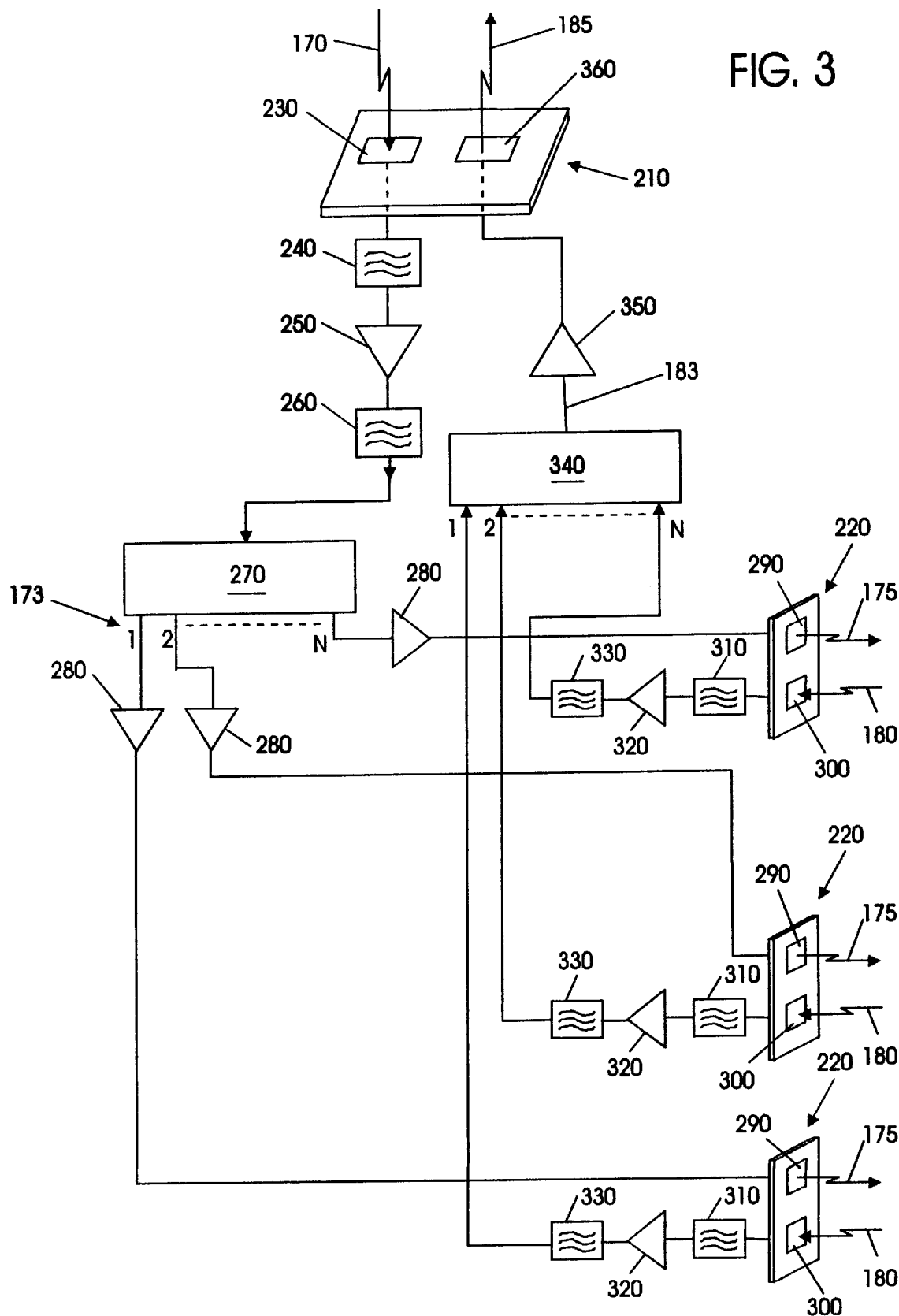
FIG. 3 illustrates a block diagram of the repeaters of the present invention.

FIG. 3 is a block diagram which illustrates the repeaters of the present invention in greater detail. Referring now to FIG. 3, in a preferred embodiment of repeaters according to the present invention, the first antenna assembly 210 comprises a patch antenna assembly although other antennas, such as quadrifilar helix antennas, may also be used. These antennas are known in the art and need not be described further herein. The first antenna assembly is further divided into a downlink receiving antenna 230 and an uplink retransmitting antenna 360.

A downlink signal 170 is received from one or more satellites 110 (illustrated in FIG. 2) via the downlink receiving antenna 230. The downlink signal 170 is then passed though a filter 240 to eliminate noise and out of band signals. The filtered downlink signal is then amplified using, preferably, a low noise amplifier 250. The amplified signal is applied to a second filter 260 to further eliminate any noise or out of band signals introduced by the low noise amplifier 250.

The downlink signal is then optimally passed through a signal divider 270 which produces up to N output signals 173. These output signals are then amplified by high gain, power amplifiers 280 before being retransmitted by a downlink signal retransmitting antenna 290. In the preferred embodiment of repeaters according to the present invention and as illustrated by FIG. 3, the downlink retransmitting antenna 290 is part of the second antenna assembly 220 which comprises a patch antenna assembly although other antennas, such as quadrifilar helix antennas, may also be used. These antennas are known in the art and need not be described further herein. The amplified and retransmitted signals 175 are then received and processed by one or more radiotelephones 120.

The satellite telecommunications repeaters 200 also receive uplink signals 180 from one or more radiotelephones 120 (illustrated in FIG. 2) by way of at least one uplink signal receiving antenna 300. In a preferred embodiment, as shown in FIG. 3, the uplink receiving antenna 300 is embodied in a separate antenna that is part of the second antenna assembly 220. After the uplink signal is received by the uplink receiving antenna 300, the signal is passed through a filter 310 to eliminate noise and out of band signals. The filtered uplink signal is then amplified, preferably using a low noise amplifier 320. The amplified signal is applied to a second filter 330 to eliminate any noise or out of band signals introduced by the low noise amplifier 320. At this point, the signal is passed through a signal combiner 340 which receives up to N signals and combines them to create a single signal combiner output signal 183. The signal combiner output signal 183 is then amplified by a power amplifier 350 and retransmitted by means of an uplink retransmitting antenna 360.

As already described, the satellite telecommunications repeaters 200 of the present invention do not perform signal processing. The satellite telecommunications repeaters 200 serve only to amplify and retransmit uplink and downlink signals received, thus functioning as non-processing repeaters to increase link margin and coverage. As a result, the repeaters 200 may be stand-alone units and are not required to be tied to satellite switching networks or to other elements of satellite cellular or conventional cellular telephone networks. Although the repeaters may include additional circuitry which detects or monitors the uplink signals 180 and/or the downlink signals 170 and performs some function as a result of a characteristic of those signals, there is no processing of the actual uplink signals 180 and the downlink signals 170 themselves.

Figure 4:
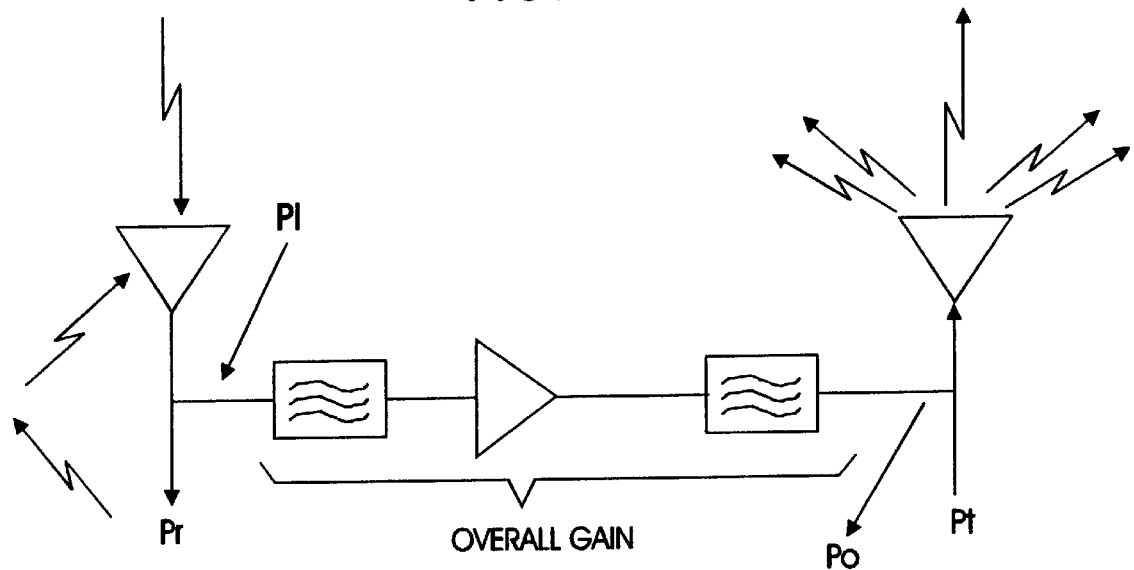
FIG. 4 illustrates a block diagram of a signal amplifier for the apparatus of FIG. 3.

In the present invention, the overall gain produced by amplification of the downlink signal 170 or the uplink signal 180 is preferably maintained at or below the isolation between antenna combinations 230, 290 and 300, 360, respectively. Referring to FIG. 4, if the overall gain is greater than the isolation between a corresponding antenna pair (for example, 300, 360), oscillation will occur. Overall Gain is defined as the relationship of the strength of the input signal ($P_i$) to the output signal ($P_o$) expressed according to the following formula:

$$\text{Overall Gain} = 10 \log (P_o/P_i) \text{ in dB.}$$

The overall gain produced by the satellite telecommunications repeaters of either the uplink or the downlink signal should not exceed the corresponding antenna pair isolation because the system may become unstable. Isolation is defined as the relationship of the received signal ($P_r$) in response to a transmitted signal ($P_t$) expressed according to the following formula:

$$\text{Isolation} = 10 \log (P_r/P_t) \text{ in dB.}$$

For a satellite telecommunications repeater sufficiently small to be embodied in a hand-held unit, it is expected that a gain of 15 dB is acceptable. The maximum allowable gain, however, will greatly depend on many factors including but not limited to the exact design specifications of the embodiment of the satellite telecommunications repeater, particularly the types of receiving and transmitting antennas employed and the relative location of the antennas. In any case, the satellite telecommunications repeater system is preferably limited to the case where:

$$[\text{Isolation}]_{dB} + [\text{Gain}]_{db} < 0$$

in order to prevent the occurrence of instability.

Figure 5B:
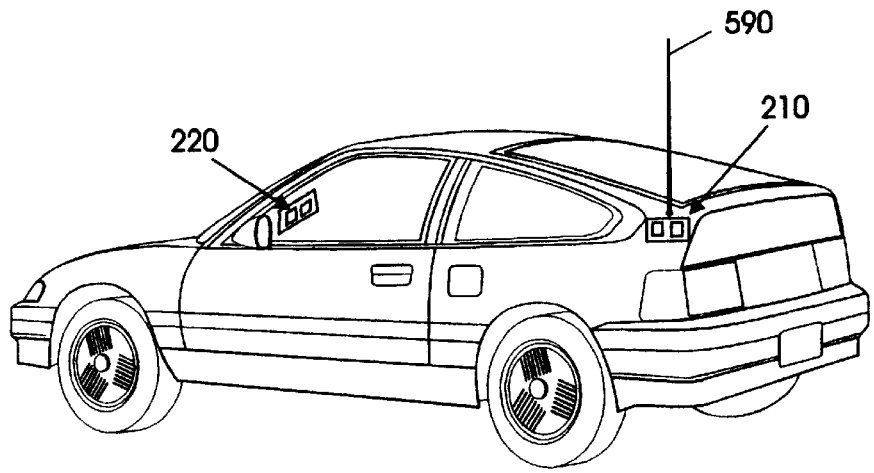
FIGS. 5A and 5B illustrate embodiments of non-portable, mounted repeaters according to the present invention.
Figure 5A:
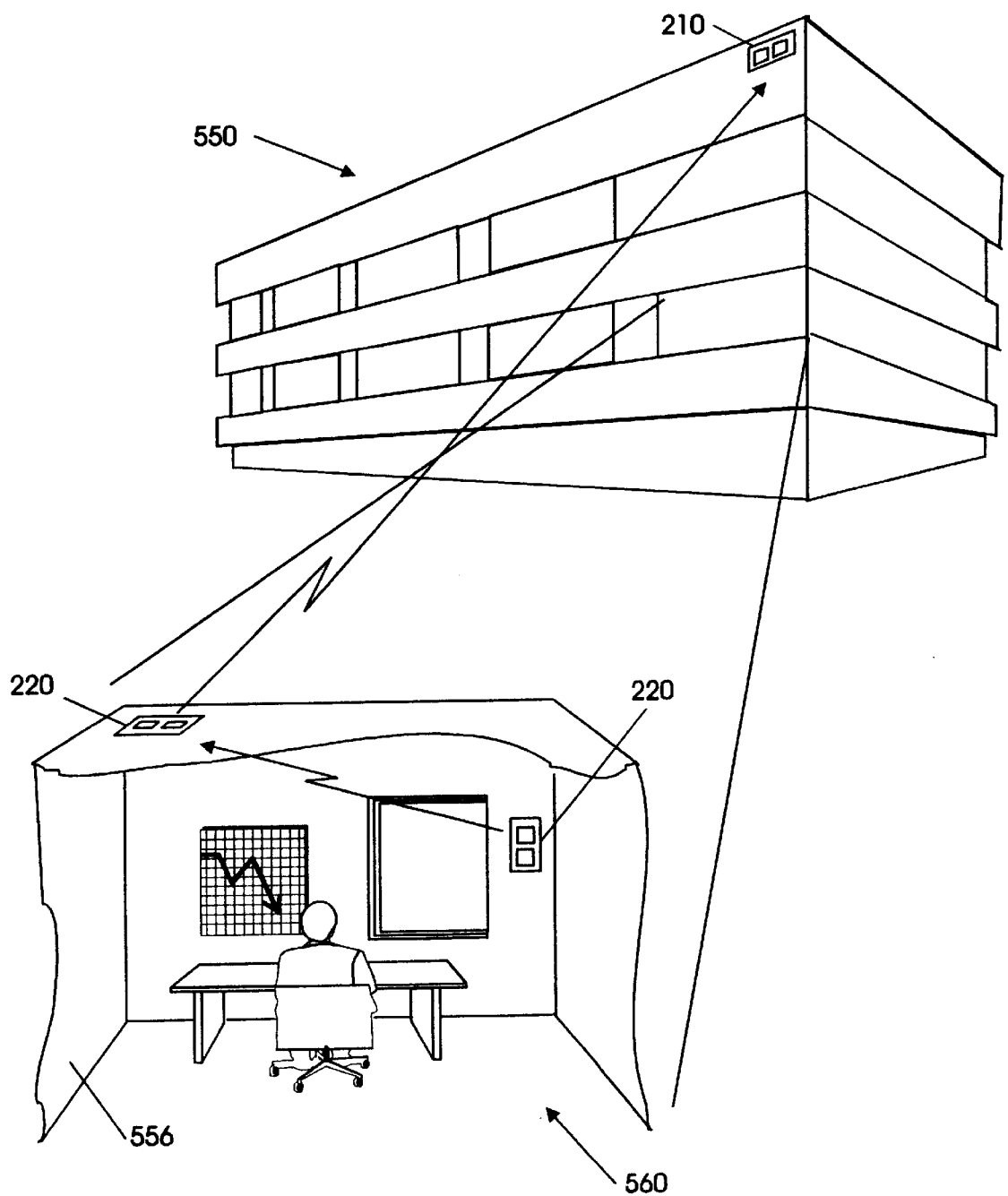
Figure 6:
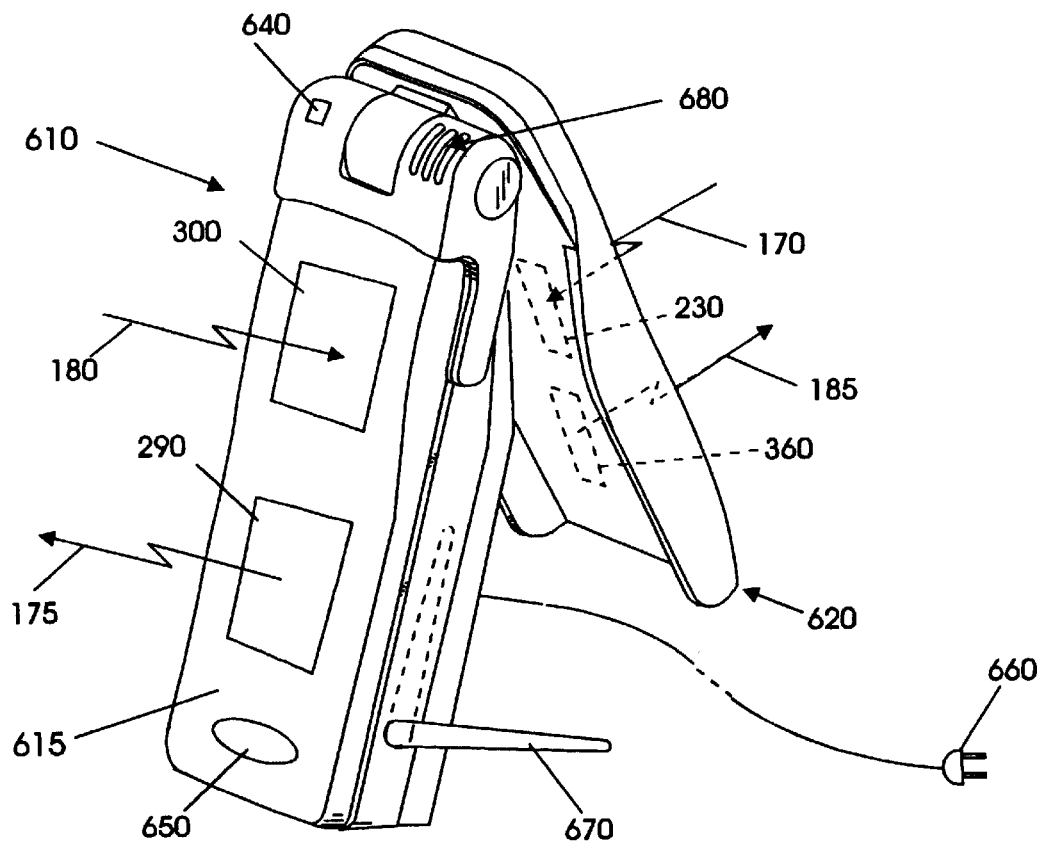
FIG. 6 illustrates an embodiment of a portable hand-held repeater according to the present invention.

Specific embodiments of the non-portable, mounted satellite telecommunications repeaters of the present invention are illustrated in FIGS. 5A and 5B. The non-portable, mounted embodiments of the satellite telecommunications repeaters of the present invention may allow operation of hand-held radiotelephones in structures where the link margins might not be otherwise sufficient to support communications.

Referring to FIG. 5A, for example, satellite telecommunications repeaters can be mounted on buildings 550 to allow satellite telecommunications signals to penetrate such structures. The first antenna assembly 210 may be mounted on a window or on the roof a building 550 and that the second antenna assembly 220 may be physically separate and placed on the inside of the building. As illustrated in FIG. 5A, the second antenna assembly 220 could be placed on a wall or ceiling of an interior office.

Non-portable, mounted embodiments of the satellite telecommunications repeaters of the present invention could also be mounted in mobile transportation vehicles, such as automobiles, buses, trains, ships, or airplanes. As seen in FIG. 5B, for example, the first antenna assembly 210 could be mounted on the top of the roof, trunk, or hood of an automobile, or might even be incorporated into an existing antenna assembly 590. The second antenna assembly 220 could then be placed at a convenient location in the passenger area of the automobile.

It is preferred that non-portable, mounted satellite telecommunications repeaters have a physical structure between the first and second antenna assemblies 210, 220. Given that non-portable, mounted repeaters according to the present invention may possibly be less restricted as to size, it is anticipated that any prior art means of aligning the repeaters to satellites may be used including, mechanical tracking and beam steering.

In these non-portable embodiments it is preferred to separate the first antenna assembly 210 from the second antenna assembly 220. Generally, the greater the physical separation of these assemblies, the greater the antenna isolation which in turn permits greater gain to be produced by the satellite telecommunications repeaters without causing instability of the system. It is thus also advantageous to separate the two antenna assemblies by using a physical structure, such as a wall or ceiling or a large ground plane.

FIG. 6 illustrates a preferred embodiment of the present invention in which a satellite telecommunications repeater is embodied in a completely portable hand-held unit. Portable hand-held satellite telecommunications repeaters include a housing 610 with multiple surfaces on which may be placed the antennas for receiving uplink signals 300, the antenna for retransmitting downlink signals 290, the antenna for receiving downlink signals 230, and the antenna for retransmitting uplink signals 360. The housing 610 is preferably made of a conductive frame which serves both to contain and protect the electronics of the satellite telecommunications repeaters and also serves as an antenna ground plane.

In addition, a flap or cover 620 may be attached to the housing 610. The flap 620 may be attached to the repeater housing 610 by any suitable method that allows the flap 620 to rotate or pivot from a closed position and to move in relation to the repeater housing 610. For example, one or more hinges may be use to attach the flap 620 to the radiotelephone. One or more of the antennas of the repeater of the present invention may then be placed on the flap 620 which would increase the antenna isolation.

In a preferred embodiment of the present invention, the antenna for receiving uplink signals 300, and the antenna for retransmitting downlink signals 290 are placed on a first face 615 of the repeater housing 610. The antenna for receiving downlink signals 230 and the antenna for retransmitting uplink signals 360 are preferably placed on the flap 620, but may be placed on another face of the housing as long as the proper relationship between repeater gain and antenna isolation are maintained. Placing the antenna for receiving downlink signals 230 and the antenna for retransmitting uplink signals 360 on the flap or cover 620 also may allow for aligning the antennas 230, 360 with satellites 110 to further increase link margin.

Many other features may also be disposed on the housing 610 or flap 620 of hand-held satellite telecommunications repeaters according to the present invention. For example, an ON/OFF indicator 640 may be disposed on a face of a housing to give ready indication of the power status of the satellite telecommunications repeaters. A switch 650 may be located on a face of the housing for turning the repeater 200 on or off. The preferred embodiment of the hand-held satellite telecommunications repeaters will also include a battery power source preferably contained within the housing 610. Additionally, it may also be desired to provide connections on a face of the repeater housing 610 allowing for a plug-in 660 source of power from an AC wall outlet or from a DC power source such as an automobile cigarette lighter socket.

Also as shown in FIG. 6, the preferred hand-held embodiment of the present invention may be supported in an upright position by one or more leg members 670. It is understood that a single leg may be used as illustrated in FIG. 6, or that a second leg may be added on the side opposite the first leg. Preferably, two leg members 670, one on each side of the satellite telecommunications repeater housing 610, are rotatably attached to the housing 610. The present invention also contemplates one or more support members pivotally attached to the back face of the unit to similarly support the unit in an upright position. These different means of support are intended to support satellite telecommunications repeaters in a position to allow alignment with a satellite. Thus, the term upright as used herein does not mean completely vertical, but is rather an expansive term meaning the range of positions which are not substantially horizontal.

As with non-portable, mounted embodiments of the present invention, the design of antennas which are suitable for portable embodiments of satellite repeaters of the present invention are well known to those of ordinary skill in this art and need not be described in detail herein. It is, however, preferred to use a patch antenna system for the portable hand-held embodiment of FIG. 6.

Due to the size, power requirements and battery capacity associated with a portable, hand-held repeater of the present invention, it is preferred that such a unit be equipped with a circuit that places its transmitter in stand-by mode when uplink signals from a radiotelephone are not present. One of ordinary skill in the art would be able to provide a circuit of this type or of any comparable type to provide a stand-by operation.

The portable hand-held embodiment of the present invention may be aligned to satellites by moving the downlink receiving antenna 230 portion of the hand-held unit to achieve the best reception and transmission between satellites and radiotelephones 120. It is also understood that a conventional signal strength meter or other indicator can be provided which will sample the strength of a downlink signal and give a read-out of the strength. If this is employed, the user of the hand-held satellite telecommunications repeater may change the position the downlink receiving antenna 230 until an increased or a maximum signal strength is received.

Figure 7:
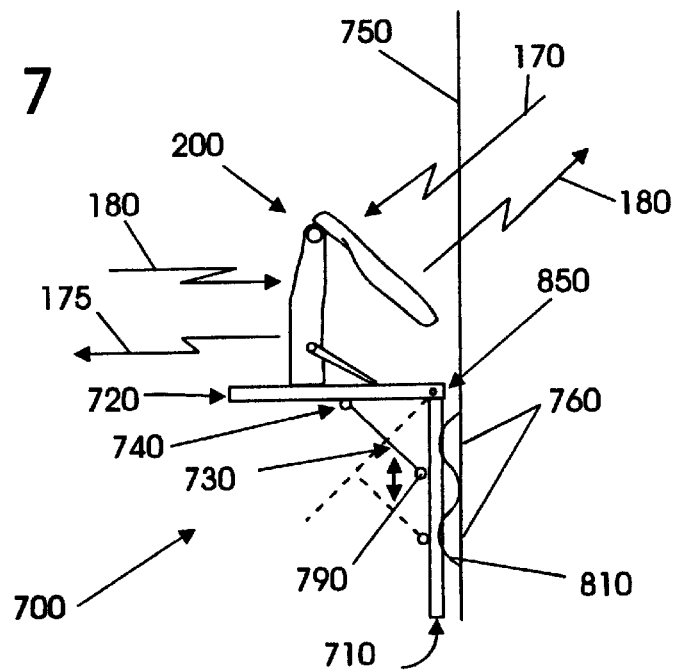
FIG. 7 illustrates a device which can attach to a window to hold a portable repeater such as illustrated in FIG. 6.

Portable satellite telecommunications repeaters of the present invention can potentially be more effective when placed in close proximity to windows in buildings rather than positioned further in the interior of the building or positioned next to walls. Devices for mounting portable hand-held satellite telecommunications repeaters of the present invention are thus provided. FIG. 7 illustrates such a device for mounting a satellite telecommunications repeater on a window.

As seen in FIG. 7, the window mounting device comprises a first surface member 710 and a second surface member 720 which are rotatably connected at an edge of the first surface member 710 and the second surface member 720. Although any type of rotatable connection between the two surface members is acceptable, a rotating hinge 850 is the preferred method of joining the two surface members. The first surface member 710 is equipped with some means for mounting the device 700 on a window surface 750. Although the first surface member 710 may be permanently attached to the window 750, for example with some type of adhesive, it is more preferred that the device 700 be releaseably mounted to the window 750 thus keeping the device 700 portable and capable of being used in different locations with a portable, hand-held satellite telecommunications repeater. One such preferred method of releaseably attaching the device 700 to a window surface 750 is provided by attaching the first surface member 710 to a window 750 with one or more suction cups 760 which may themselves be permanently or releaseably attached to the first surface member 710. The second surface member 720 can be rotated into a position essentially perpendicular to the first surface member 710 to allow placement of satellite telecommunications repeaters 200 on the second surface member 720. The second surface member 720 may be maintained in a horizontal orientation by a support bar 730.

In one embodiment, a first end 740 of the support bar 730 is attached to the second surface member 720 at a point. The attachment may be made by any connection that allows arcuate movement of the support bar 730 at the attachment point 740. A second end 790 of the support bar 730 is slidably attached to the first surface member 710 such that the support bar 730 slides between a first, closed position and a second, opened position. At the point the second end 790 reaches the opened position, a detent, snap, or other means is provided to keep the second end 790 in the opened position. It is understood that the attachments of the support member to the first surface member 710 and the second surface member 720 may be reversed without detrimental effect. Additionally, it is expected that a support member 730 may be slidably mounted to both the first surface member 710 and the second surface member 720 and that detents, snaps, or other means may be provided on both the first surface member 710 and the second surface member 720 to maintain the device an opened position.

In the drawings and specification, there have been disclosed typical embodiments of the invention and, although specific terms are employed, they are used in a generic and descriptive sense only and not for purposes of limitation, the scope of the invention being set forth in the following claims.

That which is claimed:

1. A satellite telecommunications repeater comprising:

means for receiving downlink satellite telecommunication signals from at least one satellite;

means for amplifying said downlink satellite telecommunication signals, said means for amplifying said downlink satellite telecommunication signals having a first gain;

means for retransmitting said downlink satellite telecommunication signals from said at least one satellite to at least one radiotelephone, said means for retransmitting said downlink satellite telecommunication signals having a first isolation from said means for receiving said downlink satellite telecommunication signals;

means for receiving uplink satellite telecommunication signals from said at least one radiotelephone;

means for amplifying said uplink satellite telecommunication signals from said at least one radiotelephone, said means for amplifying said uplink satellite telecommunication signals having a second gain; and means for retransmitting said uplink satellite telecommunication signals from said at least one radiotelephone to said at least one satellite, said means for retransmitting said uplink telecommunication signals having a second isolation from said means for receiving said uplink satellite telecommunication signals;

wherein said first gain produced by said means for amplifying said downlink satellite telecommunication signals does not exceed said first isolation, and wherein said second gain produced by said means for amplifying said uplink satellite telecommunication signals does not exceed said second isolation;

wherein said uplink and said downlink satellite telecommunications signals are only amplified and are not processed by said satellite telecommunications repeater;

a portable hand-held housing, said satellite telecommunications repeater being embodied in said portable hand-held housing;

wherein said means for receiving said downlink satellite telecommunications signals and said means for retransmitting said uplink satellite telecommunications signals further comprise a patch antenna assembly integral with a flap movably mounted to said housing of said satellite telecommunications repeater;

at least one extension on said hand-held housing, wherein said portable hand held housing is maintained at a desired orientation by said at least one extension and said at least one extension may be positioned to place said housing in said desired orientation; and means, responsive to said means for receiving said downlink telecommunications signals, for assisting an operator to align said satellite telecommunications repeater in relation to said at least one satellite to increase received signal strength.

2. The satellite telecommunications repeater of claim 1 further comprising:

means, responsive to said means for receiving said downlink telecommunications signals, for determining said downlink signal strength; and an operator display of downlink signal strength such that the satellite telecommunications repeater can be aligned in relation to said at least one satellite to achieve increased received signal strength.

3. A satellite radiotelephone communications system comprising:

at least one satellite;

at least one radiotelephone;

means for processing satellite radiotelephone telecommunication signals between said satellite and said radiotelephone; and a satellite telecommunications repeater placed in sufficient proximity to said radiotelephone to receive, amplify, and retransmit uplink and downlink satellite telecommunication signals between said satellite and said radiotelephone, said satellite telecommunications repeater further comprising:

means for receiving downlink satellite telecommunication signals from said at least one satellite;

means for amplifying said downlink satellite telecommunication signals from said at least one satellite;

means for retransmitting said downlink satellite telecommunication signals from said at least one satellite to said at least one radiotelephone;

means for receiving uplink satellite telecommunication signals from said at least one radiotelephone;

means for amplifying said uplink satellite telecommunication signals from said at least one radiotelephone; and means for retransmitting said uplink satellite telecommunication signals from said at least one radiotelephone to at least one satellite;

a portable hand-held housing, said satellite telecommunications repeater being embodied in said portable hand-held housing;

wherein said means for receiving said downlink satellite telecommunications signals and said means for retransmitting said uplink satellite telecommunications signals further comprise a patch antenna assembly integral with a flap movably mounted to said housing of said satellite telecommunications repeater;

at least one extension on said hand-held housing, wherein said portable hand held housing is maintained at a desired orientation by said at least one extension and said at least one extension may be positioned to place said housing in said desired orientation; and means, responsive to said means for receiving said downlink telecommunications signals, for assisting an operator to align said satellite telecommunications repeater in relation to said at least one satellite to increase received signal strength;

wherein said uplink and said downlink satellite telecommunications signals are only amplified and are not processed by said satellite telecommunications repeater.

4. The satellite radiotelephone communications system of claim 3 further comprising:

means, responsive to said means for receiving said downlink telecommunications signals, for determining said downlink signal strength; and an operator display of downlink signal strength such that the satellite telecommunications repeater can be aligned in relation to said at least one satellite to achieve increased received signal strength.

5. A method of satellite radiotelephone communications comprising the steps of:

providing a satellite telecommunications repeater embodied in a portable hand-held housing, said repeater including at least one extension on said hand-held housing, a patch antenna assembly integral with a flap movably mounted to said housing of said satellite telecommunications repeater, and means for assisting an operator to align said satellite telecommunications repeater in relation to at least one satellite to increase received signal strength;

positioning the at least one extension to place said hand-held housing in a desired orientation and thereby maintaining said portable hand-held housing at the desired orientation;

receiving downlink satellite telecommunication signals from at least one satellite using the patch antenna assembly;

amplifying said downlink satellite telecommunication signals;

retransmitting said downlink satellite telecommunication signals to at least one radiotelephone;

receiving uplink satellite telecommunication signals from said at least one radiotelephone;

amplifying said uplink satellite telecommunication signals; and retransmitting said uplink satellite telecommunication signals to said at least one satellite using the patch antenna assembly;

wherein said downlink satellite telecommunication signals are not processed between said steps of receiving and retransmitting said downlink satellite telecommunication signals;

wherein said uplink satellite telecommunication signals are not processed between said steps of receiving and retransmitting said uplink satellite telecommunication signals; and wherein said steps of receiving, amplifying and retransmitting are performed within said portable hand-held housing.

6. A satellite telecommunications repeater comprising:

means for receiving downlink satellite telecommunication signals from at least one satellite;

means for amplifying said downlink satellite telecommunication signals;

means for retransmitting said downlink satellite telecommunication signals from said at least one satellite to at least one radiotelephone;

means for receiving uplink satellite telecommunication signals from said at least one radiotelephone;

means for amplifying said uplink satellite telecommunication signals from said at least one radiotelephone; and means for retransmitting said uplink satellite telecommunication signals from said at least one radiotelephone to said at least one satellite;

wherein said uplink and said downlink satellite telecommunications signals are only amplified and are not processed by said satellite telecommunications repeater;

a portable hand-held housing, said satellite telecommunications repeater being embodied in said portable hand-held housing;

wherein said means for receiving said downlink satellite telecommunications signals and said means for retransmitting said uplink satellite telecommunications signals further comprise a patch antenna assembly integral with a flap movably mounted to said housing of said satellite telecommunications repeater;

at least one extension on said hand-held housing, wherein said portable hand held housing is maintained at a desired orientation by said at least one extension and said at least one extension may be positioned to place said housing in said desired orientation; and means, responsive to said means for receiving said downlink telecommunications signals, for assisting an operator to align said satellite telecommunications repeater in relation to said at least one satellite to increase received signal strength.

7. The satellite telecommunications repeater of claim 6 further comprising:

means, responsive to said means for receiving said downlink telecommunications signals, for determining said downlink signal strength; and an operator display of downlink signal strength such that the satellite telecommunications repeater can be aligned in relation to said at least one satellite to achieve increased received signal strength.

\* \* \* \* \*